No. 768,274. Patented August 23, 1904.

UNITED STATES PATENT OFFICE.

PEDRO FARGAS-OLIVA, OF BARCELONA, SPAIN.

PROCESS OF MANUFACTURING GLUE OR SIZE.

SPECIFICATION forming part of Letters Patent No. 768,274, dated August 23, 1904.

Application filed February 4, 1904. Serial No. 191,949. (No specimens.)

*To all whom it may concern:*

Be it known that I, PEDRO FARGAS-OLIVA, a subject of the King of Spain, residing at Barcelona, Spain, have invented a certain new and Improved Process for the Manufacture of Glue or Size Especially Adapted for Warp-Threads, of which the following is a specification.

This invention relates to a process for the manufacture of glue or size especially adapted for the warp-threads of fabrics.

Examination of the substances hitherto used for the finishing, sizing, or gumming of warp-threads of fabrics will show that none of them completely answers all the requirements of textile manufacture.

The object of the present invention is to remove this disadvantage by providing a substance which answers all the requirements in question. The process used for this purpose essentially consists in the use as a basic material of gluten treated with a liquid containing substance or substances adapted to act on and transform the gluten by fermentation and when the transformation has taken place to the desired degree further treated with an antifermentative substance or substances to prevent subsequent fermentation and preserve the preparation in permanent condition with adhesive properties.

This process is carried out as follows: Gluten as obtained in the preparation of starch from wheat-flour is mixed with about three per cent. of carrot-juice and allowed to ferment. The fermentation takes place at ordinary temperature of the atmosphere, not less, however, than 12° centigrade, and is continued for six days in summer and for eight to ten days in winter. To the liquid is then added about one per cent. of an extract of oakbark, produced by boiling one kilogram of the bark in ten liters of water and straining off the liquor. This treatment chemically destroys impurities, such as bacilli, which may be present or may be generated at certain temperatures of the place in which the treatment takes place. The destruction of these impurities may be more effectually obtained by rapid agitation of the liquid to render it well mixed with the carrot-juice or oak-bark extract.

For applying the product it is mixed with the same kind of materials as have hitherto been used, but in a much smaller proportion—viz., about twenty-five to thirty-five per cent. less—since its properties make up for the difference. It renders the thread stronger and more durable than any size hitherto used for the purpose.

The ordinary mixing substances are, for instance, flour, meal, fecula, and earthy substances. These are mechanically mixed with the gluten to form a homogeneous paste, which is allowed to stand for some time, then pressed, and divided into pieces. These pieces are pressed as thin as possible to increase homogeneousness and facilitate drying. An unalterable product is thus obtained which is finely pulverized when dry. On the other hand, the proportion or charge of the dressing can be increased to up to seventy per cent. of the weight of the fabric, according to the condition of the latter. According to the kind of fabric to which the preparation is to be applied the gluten can be first dried by the addition of any suitable substance—such as meal, starch, or the like—and then subjected some time after to the process described above.

I claim—

1. A process for the manufacture of glue or sizing containing gluten and farinaceous substances, consisting in treating the gluten with a fermentative substance, and subsequently adding to the fermented mixture a substance adapted to prevent further fermentation.

2. A process for the manufacture of glue or sizing consisting in mixing gluten with a fermentative substance, adding to the fermented mixture a substance adapted to prevent further fermentation, and mixing the product with farinaceous and earthy substances.

3. A process for the manufacture of glue or sizing consisting in mixing gluten with a fermentative substance, adding to the fermented mixture a substance adapted to prevent further fermentation, mixing the product with farinaceous and earthy substances, allowing same to dry and finally pulverizing it substantially as described.

4. A process for the manufacture of glue or sizing consisting in mixing gluten with a fermentative substance, adding to the fermented mixture a substance adapted to prevent further fermentation, stirring the mixture thus produced, mixing same with farinaceous and earthy substances, pressing and dividing this product into pieces, pressing said pieces into a thin condition, allowing same to dry and finally pulverizing them substantially as described.

5. A process for the manufacture of glue or sizing consisting in fermenting gluten with three per cent. of carrot-juice, adding to the fermented mixture one per cent. of extract of oak-bark to prevent further fermentation, stirring the mixture thus produced, mixing same with farinaceous and earthy substances, pressing and dividing this product into pieces, pressing said pieces into a thin condition allowing same to dry and finally pulverizing them substantially as described.

In witness whereof I have signed this specification in the presence of two witnesses.

PEDRO FARGAS-OLIVA.

Witnesses:
C. DONELY DURAIN,
STANLEY C. HARRIS.